United States Patent
Davidovits et al.

[15] 3,643,015
[45] Feb. 15, 1972

[54] SCANNING OPTICAL MICROSCOPE

[72] Inventors: Paul Davidovits, 95 Lakeview Terrace; Maurice David Egger, 70 Edgewood Way, both of New Haven, Conn. 06515

[22] Filed: June 19, 1970

[21] Appl. No.: 47,717

[52] U.S. Cl. .................... 178/6.8, 178/DIG. 1, 250/49.5 A, 350/91
[51] Int. Cl. ........................................ H04n 7/18, G02b 21/06
[58] Field of Search ............. 178/6.8, 7.6, 7.1, 7.2, DIG. 1, 178/DIG. 27, DIG. 35, 6; 250/49.5 A; 350/86, 91

[56] References Cited

UNITED STATES PATENTS 3,460,880  8/1969  Henderson ........................ 350/91 X
3,463,882  8/1969  Herbold ........................... 178/7.1 X

OTHER PUBLICATIONS

"Flying Spot Microscope", Young et al. Electronics July, 1953 pp. 137-139

*Primary Examiner*—Robert L. Richardson
*Attorney*—Bessie A. Lepper

[57] ABSTRACT

An optical microscope suitable for scanning below the surface of specimens of low optical contrast and particularly for scanning buried tissues and cells. Optical means focus a beam of parallel light within the object and means are provided to scan by moving an objective lens system along to axes orthogonal to the optical axis. An image is generated in a cathode-ray tube.

19 Claims, 5 Drawing Figures

Paul Davidovits
Maurice D. Egger
INVENTORS

BY [signature]
Attorney

Paul Davidovits
Maurice D. Egger
INVENTORS

PATENTED FEB 15 1972

Paul Davidovits
Maurice D. Egger
INVENTORS

BY *Bernie A. Lepper*

Attorney

SCANNING OPTICAL MICROSCOPE

This invention relates to an optical scanning microscope and more particularly to one which is suitable for microscopic observation of thick specimens of low optical contrast.

In many cases it would be highly desirable to be able to study in vivo a thin layer of buried tissue or cells at conventional optical magnification. With present microscope techniques it is not possible, for instance, to make satisfactory observations of buried brain cells in living animals. The study of these cells is, however, of fundamental importance to the understanding of many neurophysiological problems. For example, the ability to observe buried nerve cells should make it possible to determine whether or not cells of this nature are altered by changes in sensory and motor activity. It should also be possible for example to determine whether cells of the visual cortex show any change in structure when bombarded by afferent impulses; to determine whether the cortical cells from which electrical recordings are being made show any changes in morphology correlated with various phases of their electrical activity; or whether it is possible to observe the actual sprouting of cut fibers or regeneration of cells in lower vertebrates. These are but a sampling of the type of information which is sought by anatomists, and which can possibly be answered by the optical scanning microscope of this invention.

The scanning optical microscope of this invention also offers a research tool for observation of buried tissues other than cells; and may also have clinical applications other than observation and recordation of anatomical phenomena. As an example, the apparatus of this invention may use ultraviolet light to treat tumors selectively and thus avoid much destructive surgery. It may also be used to diagnose and locate certain types of tumors of the central nervous system and to make diagnostic observations of subcutaneous tissue and organs in intact organisms without exploratory surgery.

The optical scanning microscope of this invention may also be applied to industrial inspection such as the case of observing physical inconsistencies or nonuniformities below the surfaces of such materials as plastics and the like. The application of the optical scanning microscope of this invention is, of course, limited in this respect by the character of the electromagnetic radiation which can be used since it must be capable of being focused and of penetrating through the material to be examined.

Conventional transmitted light microscopy, including phase and interference microscopy, is unsuitable for observation of cells and tissue in vivo because of the thickness of the material to be examined. Moreover, enormous technical problems stand in the way of using electron microscopy for observation of living brain cells in vivo. Thus, some modification of reflected light microscopy provides the best possible approach to the solution of such a problem. However, because light reflected back into the microscope from many different layers of tissue or cells degrades the quality of the image of the object, conventional reflected light microscopy is usually unsatisfactory with low contrast translucent material such as unstained brain tissue and the like.

An early attempt at solving this problem was the design and construction of a scanning microscope in which the optical field was scanned by a perforated rotating disc (see for example Petran, Hadravsky, Egger, and Galambos, "A Tandem-Scanning Reflected Light Microscope," *J. Opt. Soc. Amer.*, 58:661–664 (1968)). Although the instrument described in this reference eliminated unwanted reflections and allowed the observation of brain cells or similar tissue, the use of light was inefficient in that no more than about $10^{-5}$ to $10^{-7}$ or less of the light incident from the source traveled through the eyepiece to form an image. U.S. Pat. No. 3,013,467 describes an optical scanning microscope using a source of nonparallel light and achieving scanning by moving the object to be examined. This arrangement requires that the object be rigidly mounted on a moving scanning platform, a highly impractical arrangement for the examination of objects of any size. Moreover, the point light source used in U.S. Pat. No. 3,013,467 limits the light energies obtainable in the device and hence the resolution and the final scan obtainable. Other devices designed to obtain substantially the same objects in different ways as the microscope of this invention are described by Katsuki, Suga, Nomato and Nakatsubo in *Proc. Japan Acad.*, 37:588(1961); Egger and Petran in *Science* 157:305–307 (1967); and by Katsuki and Kanno in *Jap. J. Physiol.* 18:391–402, (1968). Although, some of the devices described in this prior art have met with some limited success, they have not developed into practical optical scanning microscopes.

It is, therefore, a primary object of this invention to provide an improved optical scanning microscope particularly suitable for observation of thick specimens of low optical contrast. It is another object of this invention to provide an apparatus of the character described for in vivo observations of living cells, tissues, fibers, etc. Another object of this invention is to provide such an apparatus which permits the object to be examined to remain fixed, thereby increasing the practical accuracy of the scan and eliminating the necessity of mounting the object rigidly to a moving scanning platform. An additional object of this invention is to provide an apparatus which can use a wide range of the electromagnetic spectrum, i.e., from the ultraviolet into the infrared. Yet another object is to provide such an apparatus which can use a laser as a source of parallel light thus making it possible to increase the range of light energy obtainable. Still another object is to provide an apparatus of the character described which is relatively simple to construct and operate. Other objects of the invention will in part be obvious and will in part be apparent hereinafter.

The invention accordingly comprises the features of construction, combinations of elements, and arrangement of parts which will be exemplified in the constructions hereinafter set forth, and the scope of the invention will be indicated in the claim.

For a fuller understanding of the nature and objects of the invention, reference should be had to the following detailed description taken in connection with the accompanying drawings in which FIG. 1 is a diagrammatic view of the apparatus of this invention in a preferred embodiment;

In the apparatus of this invention parallel radiant energy from a suitable source, e.g., a laser, is optically focused by a lens system within the object to be scanned. The lens system is preferably moved along two mutually perpendicular axes orthogonal to the incident parallel beam, within the scanning limits from about one-hundredth to one millimeter. The scanning directions will henceforth be called the "x-axis" and "y-axis." It is also within the scope of this invention to move the elements of the lens system orthogonal to the incident beam but not necessarily in mutually perpendicular directions. The scanning motion is small enough so that the total amount of incident parallel radiant energy intercepted by the lens system is not appreciably altered in the course of scanning. The motion of the lens system in the x and y directions causes the focused light to scan the desired region in the object.

A fraction of the radiant energy reflected from the object is intercepted by the scanning lens system. Only the radiant energy reflected from the focal point is projected back into a parallel beam. Radiant energy reflected from other parts of the object diverges. Only the parallel beam of radiant energy reflected from the object in the scanned area is preferentially transmitted to a detector adapted to produce electrical signals which are proportional to the reflected energy. The electrical signals are therefore proportional only to the radiation reflected from the thin section at the focal plane of the scanning lens system.

These signals along with signals synchronized with the x and y movements of the lens system are transmitted to an image-display device such as a cathode-ray tube. Magnification is obtained because the displayed image is made larger than the scanned area in the object. As in all optical microscopes, the resolution is on the order of the wavelength of the incident radiation.

In the preferred embodiment the lens system comprises two objective lenses, one of which is moved along the x-axis and the other of which is moved along the y-axis to obtain the necessary scanning. The preferred source of parallel radiant energy is a laser which may, if desired, be pulsed. In some cases the cells or tissues to be examined may be stained, although this has not been found necessary in many cases.

Figure 1:
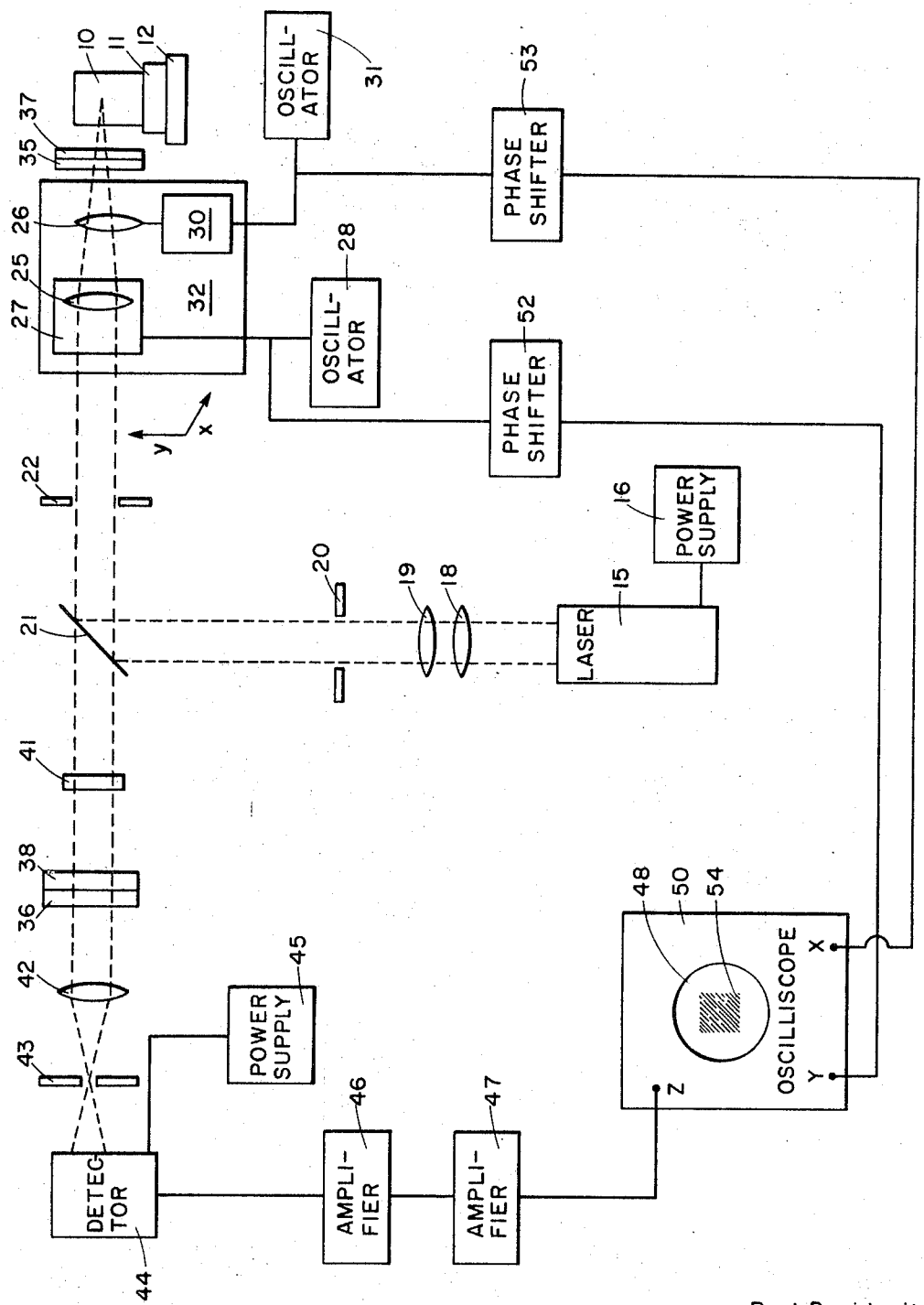

A preferred embodiment of the apparatus of this invention is shown in FIG. 1. The object 10 to be examined is placed upon a support 11 which, if desired, may be located on a movable platform 12 having suitable means for making gross as well as fine adjustments in all directions. Fine adjustment of the position of the object along the optical path may be used for focusing; while gross movement of the object may be desirable for industrial inspection purposes. Radiant energy is focused within the object by means of the optical arrangement diagrammed in FIG. 1. A laser 15 serves as a source of essentially parallel light and is powered by power supply 16. Since lasers are available to produce essentially parallel radiant energy over a very broad wavelength range, the use of a laser offers a wide range of choice in radiant energy source characteristics. Moreover, the laser may be pulsed such as by pulsing the source of radiation used to excite the laser. This may make possible the use of very high instantaneous light energies with the dissipated power being maintained below that threshold which might damage delicate tissues. Although, it is not necessary to have a source of coherent radiation, it is generally preferable since it is easier to focus coherent radiation. It is not necessary that the radiation used be monochromatic.

Two collimating lenses 18 and 19 are used to insure that the laser light is completely parallel; and an adjustable iris 20 is inserted in the optical path to eliminate any aberrations and to restrict the light beam to a desired diameter. A half-silvered mirror 21 serves as a beam splitter and directs the light beam through a second adjustable iris 22 to a pair of objective focusing lenses 25 and 26 which are antireflection coated. Lens 25 is mounted on a transducer 27 which is driven by a suitable driving means such as an audio-oscillator 28. The transducer 27 and lens 25 are so arranged as to provide for the reciprocal motion of lens 25 along the y-axis of the scanning system. In like manner lens 26 is mounted on a transducer 30 which is driven by a suitable driving means such as an audio-oscillator 31. The transducer 30 and lens 26 are so arranged as to provide for the reciprocal motion of lens 26 along the x-axis of the scanning system.

The scanning motion of the two objective lenses 25 and 26 may be achieved by a number of different means including mechanical, piezoelectric or electrostrictive devices. Although it is preferable to move both of the lenses 25 and 26 at frequencies of the order of 50 to several hundred cycles per second, it is within the scope of this invention to scan by moving one of the lenses at a relatively slow rate such as by use of a worm gear drive. The actual extent of the scanning excursions or lens displacement will typically be between about one-hundredth and one millimeter.

The transducers 27 and 30 and their associated lenses 25 and 26 may in turn be mounted on a platform 32 which is movable by any suitable, known means. Movable platform 32 provides another means for focusing the light beam within the object 10.

The combined focal point of the two vibrating lenses 25 and 26 is the point of scanning. A compound lens system, such as objective lenses 25 and 26, behaves as a single lens. In the absence of the second lens 26, the parallel light from the laser would be focused at $f_1$. However, with lens 26 at a distance $d$ from lens 25, the virtual image of lens 25 acts as the object for lens 26. Thus, for lens 26, the effective focal length $s$ becomes $-(f_1-d)$ and the effective focal length $s'$ of the two lenses in combination may be shown to be represented by the expression $$s' = \frac{f_2(f_1 - d)}{f_1 + f_2 - d}$$

where $f_1$ and $f_2$ are the focal lengths of lenses 25 and 26 respectively, and $d$ is the spacing between the lenses.

Figure 2:
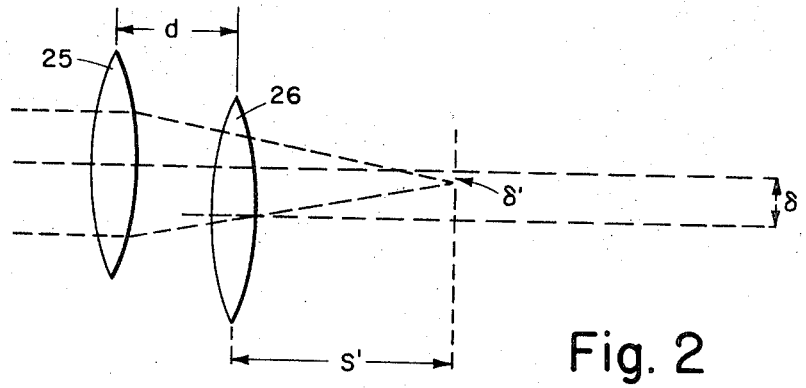
FIG. 2 is a optical diagram showing the manner in which the focal point of the lens system shifts when two objective lens are used and are moved to obtain the desired scanning pattern.

In the absence of the second lens 26, a displacement of the lens from the optical axis of the system by a distance $\delta$ results in a corresponding displacement of the focal point by the same amount. In the case of the two lens combination of FIG. 1 the displacement of either lens by a distance $\delta$ produces a displacement of the focal point in the same direction, but the displacement of the focal point is altered in magnitude. (See FIG. 2).

The actual displacement of the focal point $(\delta')$ of this compound lens system may be expressed as $$\delta' = \delta \left( \frac{f_2}{f_1 + f_2 - d} \right)$$

where $f_1$ and $f_2$ are the focal lengths of lenses 25 and 26, $d$ is the distance between lenses and $\delta$ is the displacement of either lens from the optic axis.

The placement of a λ/4 plate 35 between the lens system (lens 25 and 26) and the object is normally not required unless it is desired to change the polarization of the light striking the object by 180° from that of the incoming light. This optional λ/4 plate 35 is used in conjunction with an optional analyzer 36 located in the return optical path to block out any scattered light reflected from the optical surfaces. It has been found that both the λ/4 plate 35 and analyzer 36 are generally not required since scattered light is normally not a problem in the apparatus. In like manner, it may be desirable under certain circumstances to use chopper 37 adjacent to the λ/4 plate and an interference filter 38 adjacent to the analyzer, the chopper serving as a means of providing an intermittent signal to an AC detector system and the interference filter serving as an additional means to control the character of the reflected light transmitted to the detecting means. However, the chopper 37 and interference filter 38 are normally not required and hence they may be considered as optional components in the optical system of the apparatus.

The light reflected by the object 10 under observation is directed back through the lens system (lenses 25 and 26) and is transmitted through the half-silvered mirror beam splitter 21, through a compensating glass plate 41 adapted to compensate for the displacement of the light beam produced by the transversal of the reflected light through the half-silvered mirror 21 and then through a focusing, antireflection-coated objective lens 42. The lens 42 in turn preferentially focuses the parallel component of the reflected light through a pinhole 43 (which may also be an optical filter) onto a photomultiplier tube 44 serving as a radiant energy-detecting means adapted to produce electrical signals which are proportional to the radiant energy reflected by the object as it is scanned by the lens system. Since the nonparallel components of the reflected light do not reach the detector, the unwanted reflections from the object are suppressed. Only the radiation reflected from the thin scanned section near the focal plane of the scanning lens system is detected.

Power is furnished to the photomultiplier 44 from a suitable power supply 45 and the signal output of the photomultiplier is amplified by appropriate, known equipment such as by a combination of an operational amplifier 46 and amplifier 47. The amplified signals from the detector are fed into the z-axis of a display means such as the cathode-ray tube 48 of an oscilloscope 50. The signals generated by the reflected light, as the lenses 25 and 26 experience their scanning excursions, control the intensity of the display on the cathode-ray tube 48 and hence give rise to variations in the light and dark pattern 54 of the area scanned.

It is also, of course, necessary to impart motion along the x-axis and y-axis of the cathode-ray tube and to synchronize these motions with those experienced by the lenses 25 and 26. This is accomplished by connecting audio-oscillator 28 through an appropriate phase shifter 52 to the y-axis of the tube and by connecting audio-oscillator 31 through phase shifter 53 to the x-axis. The display 54 on the cathode-ray tube 54 thereby becomes a visual image of the scanned object area.

The scanning optical microscope of FIG. 1 has been used to examine buried nerve cells at various depths. The limit of resolution using a 5mW Ne-He continuous-wave laser ($\lambda = 6,328$ A.) was about $0.5\mu$. The depth which can be penetrated is governed by the wavelength of the radiation used, the intensity of the radiation and the nature of the material being observed. Depths of one millimeter are relatively easy to achieve using the Ne-He laser and it is anticipated that depths of at least three millimeters can be attained. Magnifications attainable are of the same order of magnitude as those obtained by using conventional optical microscopes.

Figure 3:
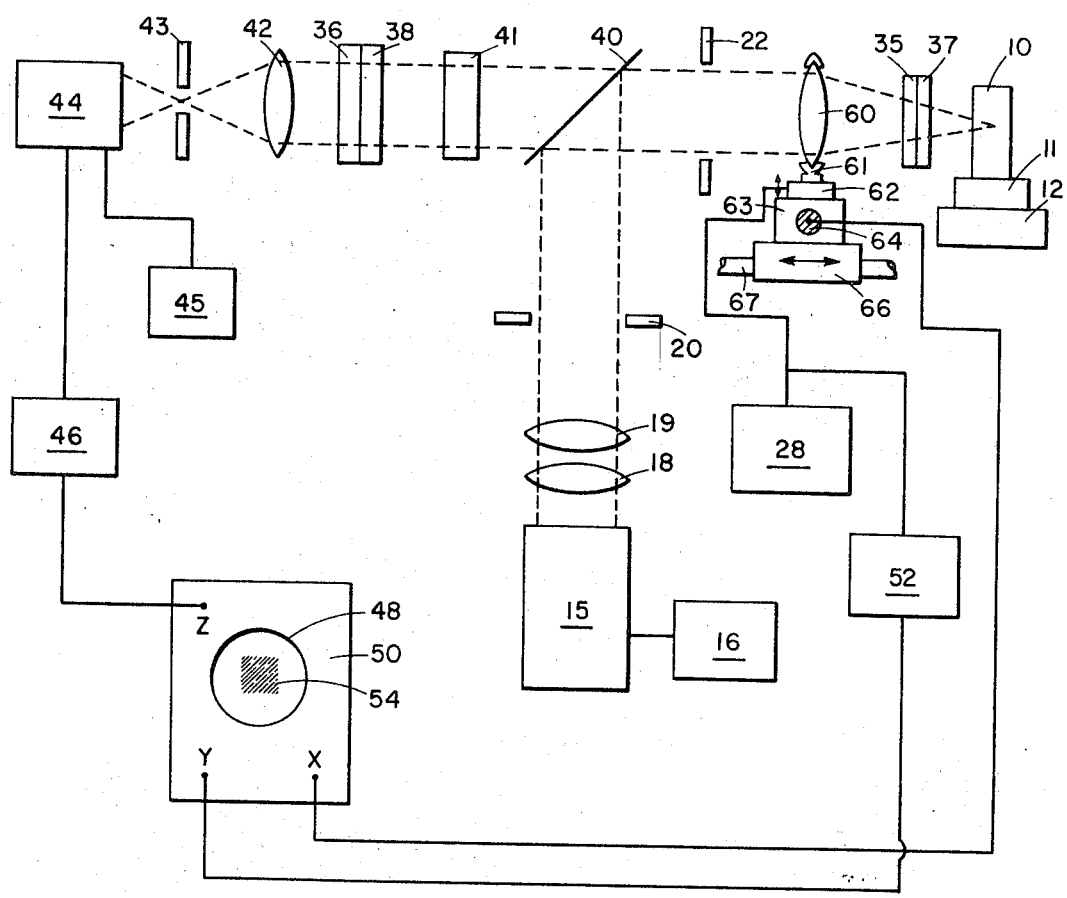
FIGS. 3 and 4 are diagrammatic views of a modification of the apparatus in FIG. 1 using only one objective lens in focusing the light into the subject to be observed.
Figure 4:
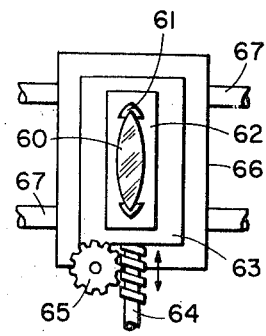

FIGS. 3 and 4 illustrate another embodiment of the scanning optical microscope of this invention in which a single objective lens is used to focus the parallel light beam into the object, and in which means are provided to move the lens rapidly in one scanning direction and slowly in the other scanning direction. In FIGS. 3 and 4 like reference numerals are used to refer to like components in FIG. 1.

In the embodiment of FIGS. 3 and 4 the single objective lens 60 is mounted in a support 61 which in turn is affixed to transducer 62 adapted to scan along the y-axis. The transducer is in turn fastened to a platform 63 which is moved along the x-axis by any suitable drive means shown as a combination of worm 64 and worm gear drive 65 driven by a motor not shown. This entire assembly of lens, transducer, platform and worm gear drive may in turn be affixed to support 66 mounted on parallel shafts 67. Support 66 may be moved by any suitable mechanism (not shown) designed to attain very fine position adjustments to focus the beam at the desired depth in the object 10. It will, of course, be appreciated that any other means may be used to move lens 60 to achieve the desired scan excursions and that the means shown in FIGS. 3 and 4 are merely exemplary of one such mechanism.

Figure 5:
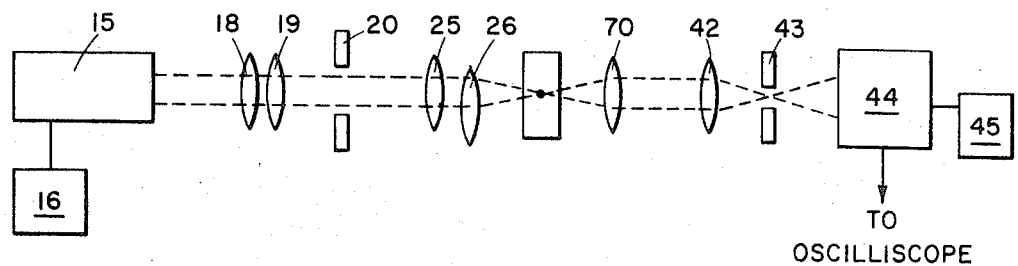
FIG. 5 is a diagrammatic view of the scanning microscope of this invention adapted for transmission microscopy.

The embodiment of the apparatus of this invention shown in FIG. 5 is suitable for transmission microscopy. In FIG. 5 like components are identified by the same reference numerals used in FIG. 1. It will be seen that the parallel radiation from laser 15 is focused at a point within object 10 and then transmitted through the object by way of lenses 70 and 42 to the photomultiplier 44. The focusing lens system may be formed of the combination of lenses 25 and 26 as shown in FIG. 5 or it may be formed as a single lens as in FIG. 3. The lens system may be moved for scanning in the mode described for FIG. 1 or for FIGS. 3 and 4.

The apparatus of this invention makes possible the scanning of thin sections within thick specimens of low optical contrast. The use of parallel light, which can be focused to a point area and reflected back as parallel light makes it possible to construct a system in which the object to be observed is held motionless and the focusing lens system is moved to achieve the necessary scanning. The apparatus is amenable to the use of a relatively wide range of the electromagnetic spectrum, limited only by the ability to provide the necessary radiant energy in a parallel beam and to focus it. In the shorter wavelength, ultraviolet, it may be desirable or necessary to use quartz lenses; while in the longer wavelength, infrared, it may be necessary to form optical components of such materials as the alkali halides, cesium iodide or other materials known to be suitable for this purpose.

The scanning optical microscope of this invention makes possible the study of buried cells and tissues in vivo and provides a valuable anatomical research tool.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

We claim:
1. A scanning optical microscope, comprising in combination
   a. a source of parallel radiant energy;
   b. optical focusing means including objective lens means adapted to focus said radiant energy as a point source within an object to be scanned;
   c. scanning means adapted for reciprocally moving said objective lens means of said optical focusing means along two axes orthogonal to the optical axis;
   d. radiant energy-detecting means adapted to produce electrical signals proportional to radiant energy received thereby;
   e. optical transmission means including objective lens means adapted to transmit radiant energy from within said object to said radiant energy-detecting means, the principal axis of said objective lens means of said optical transmission means being parallel to the principal axis of said objective lens means of said optical focusing means; whereby only radiant energy reflected at the focal point of said objective lens means of said optical focusing means is detected; and
   f. three-axes display means adapted to generate a visual image, the z-axis being connected to said radiant energy-detecting means thereby to control the light intensity of said image, and the x- and y-axes being connected to said scanning means thereby to synchronize the x and y motions of said display means with the motion of said objective lens means of said optical focusing means.

2. A scanning optical microscope in accordance with claim 1 wherein said scanning means move said objective lens means of said optical focusing means along two mutually perpendicular axes.

3. A scanning optical microscope in accordance with claim 1 wherein said source of parallel radiant energy is a laser.

4. A scanning optical microscope in accordance with claim 1 wherein said optical focusing means comprises collimating lens means, beam-splitting means and beam diameter-restricting means in addition to said objective lens means.

5. A scanning optical microscope in accordance with claim 4 wherein said optical focusing means also includes a $\lambda/4$ plate interposed between said lens system and said object.

6. A scanning optical microscope in accordance with claim 1 including means to move said object along the axis of the optical path of said radiant energy, whereby the depth of scan within said object may be adjusted.

7. A scanning optical microscope in accordance with claim 1 including means to move said object with respect to said scanning means.

8. A scanning optical microscope in accordance with claim 1 wherein said objective lens means of said optical focusing means comprises two objective lenses held in spaced apart relationship.

9. A scanning optical microscope in accordance with claim 8 wherein said scanning means comprises separate transducer means associated with each of said lenses.

10. A scanning optical microscope in accordance with claim 8 wherein said scanning means comprises transducer means associated with one of said lenses and means to move the other of said lenses in slow mode.

11. A scanning optical microscope in accordance with claim 1 including means to move said optical focusing means along the optical axis of said lens system.

12. A scanning optical microscope in accordance with claim 1 wherein said radiant energy is reflected from said object to said radiant energy-detecting means and said optical transmission means comprises beam-splitting means, beam-compensating means, and objective lens.

13. A scanning optical microscope in accordance with claim 12 in which said optical transmission means also includes an optical interference filter and an optical analyzer.

14. A scanning optical microscope in accordance with claim 1 wherein said three-axis display means comprises a cathode-ray tube.

15. A scanning optical microscope in accordance with claim 1 wherein said $x$-axis and $y$-axis of said display means are connected to said scanning means through phase-shifter means adapted to achieve precise synchronization between the motions of said lens means and the $x$ and $y$ motions of said display means.

16. A scanning optical microscope, comprising in combination
   a. a laser as a source of parallel radiant energy;
   b. optical means adapted to focus radiant energy as a point source within an object to be scanned and comprising in combination
      1. collimating lens means,
      2. beam-splitting means,
      3. means to define the diameter of the beam of said radiant energy,
      4. focusing lens means;
   c. scanning means for imparting scanning motions to said lens means along two axes orthogonal to the optical axis;
   d. radiant energy-detecting means adapted to produce electrical signals proportional to radiant energy received;
   e. optical means adapted to reflect radiant energy from within said object to said radiant energy-detecting means and comprising
      1. said beam-splitting means,
      2. beam-compensating means,
      3. optical focusing means,
      4. means to screen out scattered light located at said focal point of said optical focusing means; and
   f. a cathode-ray tube-display means, the $z$-axis of which is connected to said radiant energy-detecting means and the $x$-axis and $y$-axis of which are connected to said scanning means.

17. A scanning optical microscope in accordance with claim 16 wherein said focusing lens means of (b.) comprises two objective lenses held in spaced apart relationship and said scanning means comprises separate transducer means associated with each of said lenses.

18. A scanning optical microscope in accordance with claim 16 including means to move said object along the axis of the optical path of said radiant energy, whereby the depth of scan within said object may be adjusted.

19. A scanning optical microscope in accordance with claim 16 including means to move said focusing lens means along the axis of the optical path of said radiant energy striking said object.

* * * * *